(12) United States Patent
Miller et al.

(10) Patent No.: US 8,343,643 B2
(45) Date of Patent: Jan. 1, 2013

(54) BATTERY PACK INCLUDING A SUPPORT FRAME

(75) Inventors: William Miller, Anderson, SC (US);
Jesse Jerabek, Anderson, SC (US);
Zach Scott, Easley, SC (US)

(73) Assignee: Techtronic Power Tools Technology Limited, Tortola (VG)

( * ) Notice: Subject to any disclaimer, the term of this patent is extended or adjusted under 35 U.S.C. 154(b) by 100 days.

(21) Appl. No.: 12/860,602

(22) Filed: Aug. 20, 2010

(65) Prior Publication Data

US 2012/0045671 A1 Feb. 23, 2012

(51) Int. Cl.
*H01M 2/02* (2006.01)

(52) U.S. Cl. ........... 429/71; 429/72; 429/87; 429/99; 429/100; 429/120; 429/148; 429/159

(58) Field of Classification Search ............ 429/71, 429/72, 82, 87, 99, 100, 120, 148, 158, 159
See application file for complete search history.

(56) References Cited

U.S. PATENT DOCUMENTS

| | | | |
|---|---|---|---|
| 5,144,217 A | 9/1992 | Gardner et al. | |
| 5,180,644 A | 1/1993 | Bresin et al. | |
| 5,866,276 A * | 2/1999 | Ogami et al. | 429/120 |
| 6,004,689 A | 12/1999 | Walker et al. | |
| 6,087,038 A * | 7/2000 | Flament et al. | 429/120 |
| 6,373,228 B1 * | 4/2002 | Sakakibara | 320/150 |
| 6,380,713 B2 | 4/2002 | Namura | |
| 6,424,117 B1 | 7/2002 | Vejraska | |
| 6,428,925 B1 | 8/2002 | Takeno et al. | |
| 6,537,694 B1 | 3/2003 | Sugiura et al. | |
| 6,566,005 B1 | 5/2003 | Shimma et al. | |
| 6,627,345 B1 | 9/2003 | Zemlok et al. | |
| 6,636,016 B2 | 10/2003 | Tanaka et al. | |
| 6,783,886 B1 | 8/2004 | Sakakibara et al. | |
| 6,805,997 B1 | 10/2004 | Katayama | |
| 6,933,076 B2 | 8/2005 | Ura et al. | |
| 7,157,882 B2 | 1/2007 | Johnson et al. | |
| 7,238,443 B2 | 7/2007 | Sakakibara | |
| 7,397,218 B2 | 7/2008 | Rejman | |

(Continued)

FOREIGN PATENT DOCUMENTS

DE 20023629 U1 5/2005

(Continued)

OTHER PUBLICATIONS

18V Litheon SlimPack Battery, BAT609.eps, available online at: <http://www.boschtools.com/products/tools/pages/boschproduct-detail.aspx?pid=bat609>, available at least as early as Aug. 20, 2010.

(Continued)

*Primary Examiner* — Robert B Davis
(74) *Attorney, Agent, or Firm* — Michael Best & Friedrich LLP

(57) ABSTRACT

A battery pack including a support frame. The support frame includes a plurality of recesses for receiving a plurality of battery cells, a first vent, a second vent, a first peripheral support section, a second peripheral support section, and an air passage. The first vent is located on a first distal end of the support frame, the second vent is located on a second distal end of the support frame, and the air passage is located between the first vent and the second vent. The first and second peripheral support sections space apart and securely hold the plurality of battery cells within the battery pack.

20 Claims, 19 Drawing Sheets

U.S. PATENT DOCUMENTS

| | | | |
|---|---|---|---|
| 7,567,058 | B2 | 7/2009 | Shimizu et al. |
| 7,572,547 | B2 | 8/2009 | Sakakibara |
| 2003/0082439 | A1 | 5/2003 | Sakakibara |
| 2004/0241539 | A1 | 12/2004 | Katayama |
| 2004/0257038 | A1 | 12/2004 | Johnson et al. |
| 2005/0058890 | A1* | 3/2005 | Brazell et al. .................. 429/99 |
| 2005/0079408 | A1 | 4/2005 | Hirano |
| 2006/0244315 | A1 | 11/2006 | Kogan et al. |
| 2007/0264536 | A1 | 11/2007 | Mizoguchi |
| 2008/0113262 | A1 | 5/2008 | Phillips et al. |
| 2008/0118821 | A1 | 5/2008 | Gehring et al. |
| 2008/0286640 | A1 | 11/2008 | Naito |
| 2008/0286641 | A1 | 11/2008 | Yonishi |
| 2008/0286642 | A1 | 11/2008 | Naito et al. |
| 2008/0305390 | A1 | 12/2008 | Naito |
| 2009/0004555 | A1 | 1/2009 | Lohr et al. |
| 2009/0017372 | A1 | 1/2009 | Rejman et al. |
| 2009/0061302 | A1 | 3/2009 | Scott et al. |
| 2009/0072785 | A1 | 3/2009 | Moon |
| 2009/0274948 | A1 | 11/2009 | Calderone |
| 2009/0297928 | A1 | 12/2009 | Taga |

FOREIGN PATENT DOCUMENTS

| | | | |
|---|---|---|---|
| EP | 1030388 A1 | 8/2000 | |
| WO | 03/083961 A2 | 10/2003 | |
| WO | WO 2009/02096 A1 * | 12/2008 | |

OTHER PUBLICATIONS

18V Litheon FatPack Battery, BAT618.eps, available online at: <http://www.boschtools.com/products/tools/pages/boschproduct-detail.aspx?pid=bat618>, available at least as early as Aug. 20, 2010.

* cited by examiner

BATTERY PACK INCLUDING A SUPPORT FRAME

BACKGROUND

This invention relates to a battery pack. Battery packs for devices (e.g., power tools) are often subjected to stresses and strain beyond that of other battery powered devices. For example, battery powered devices used at a construction site or in a similar environment may be subjected to shaking, vibration, being dropped, high temperatures, and the like.

SUMMARY

Battery packs that are subjected to such adverse conditions can become damaged or rendered inoperable if they are not properly constructed for operation in such conditions. For example, many battery packs include a plurality of battery cells fastened closely together and connected at their terminal ends by a plurality of terminal connectors. Such a cell configuration can impact both the short term and long term use of the battery pack. In the absence of a frame which provides support to the cells, the cells can become dislodged or separated from the other cells. To prevent damage, a tight bunching of the cells is used. However, a tight bunching of the cells reduces the ability of the battery pack to regulate the temperature of the cells in the pack. For example, cells near a middle portion of the bunch have little or no space in which to radiate heat. In some battery packs, the cells along the periphery of the bunch may have access to one or more air passages intended to provide forced-cooling air to the cells, but these battery packs do not adequately radiate heat when forced-air is not being provided to a dedicated air intake (e.g., the battery pack is passive).

The invention provides a battery pack that includes a support frame. The support frame is configured to receive a plurality of battery cells, provide individual support to each battery cell, maximize air flow around and over each of the battery cells, and prevent or limit overheating. The battery pack support frame includes a plurality of recesses for receiving the plurality of battery cells, a first vent located on a first distal end of the support frame, a second vent located on a second distal end of the support frame, a recess located between the first vent and the second vent, a first peripheral support section, and a second peripheral support section. The first and second peripheral support sections separate and securely hold the plurality of battery cells within the battery pack.

In one embodiment, the invention provides a battery pack. The battery pack includes a plurality of battery cells, a housing portion, and a support frame. The housing portion includes a first air vent. The support frame includes a second air vent positioned at a first end of the support frame, a third air vent positioned at a second end of the support frame, and an air passage positioned between the second air vent and the third air vent. The first air vent is positioned on the same side of the support frame as the third air vent, and the first air vent is at least partially isolated from the third air vent by a heat sink. The support frame is configured to receive the plurality of battery cells such that the battery cells are spaced apart from one another.

In another embodiment, the invention provides a battery pack that includes a housing, a plurality of battery cells, and a support frame. The housing includes a first air vent, and the support frame includes a second air vent, a first peripheral support section, a second peripheral support section, and a recess. The support frame is configured to receive the plurality of battery cells and space apart the battery cells from one another. The second air vent is positioned at a distal end of the support frame, and the second air vent is positioned above the first air vent. The second air vent is at least partially isolated from the first air vent by a heat sink. The recess has a uniform width between the first peripheral support section and the second peripheral support section, and an outer surface of at least one of the plurality of battery cells between the first peripheral support section and the second peripheral support section is substantially completely exposed to air within the recess.

In another embodiment, the invention provides a battery pack that includes a support frame. The support frame is configured to receive a plurality of battery cells which are physically spaced apart from one another by the support frame. The support frame includes a first air vent positioned at a first end of the support frame, a second air vent positioned at a second end of the support frame, a first peripheral support section, a second peripheral support section, and an air passage formed between the first peripheral support section and the second peripheral support section. The air passage extends between the first air vent and the second air vent, and an outer surface of at least one of the plurality of battery cells between the first peripheral support section and the second peripheral support section is substantially completely exposed to air within the air passage.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Embodiments of the invention described herein relate to a battery pack for use with portable electrical devices, such as power tools. The battery pack includes a support frame that is configured to receive a plurality of battery cells. The battery pack support frame includes a plurality of recesses for receiving the plurality of battery cells, a first vent located on a first distal end of the support frame, a second vent located on a second distal end of the support frame, a recess or air passage located between the first vent and the second vent, a first peripheral support section, and a second peripheral support section. The first and second peripheral support sections separate (e.g., space apart) and securely hold the plurality of battery cells within the battery pack.

Figure 1:
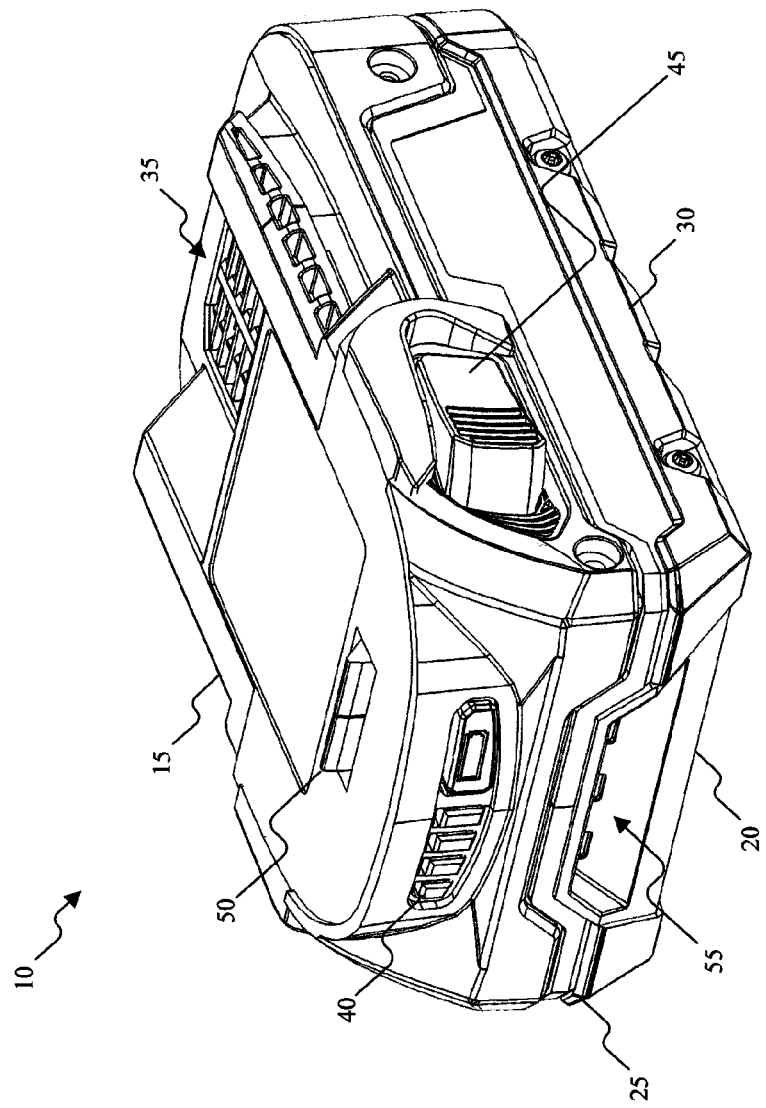
FIG. 1 is a perspective view of a battery pack according to an embodiment of the invention.
Figure 2:
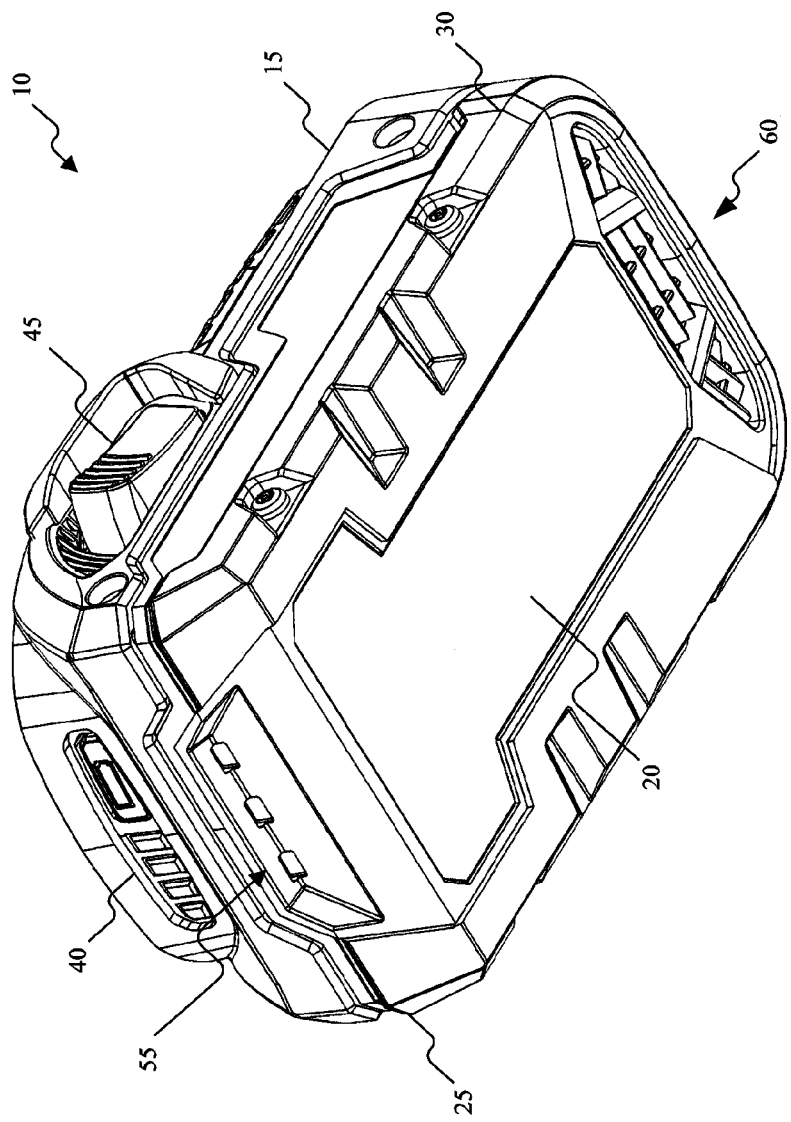
FIG. 2 is another perspective view of the battery pack of FIG. 1.

FIGS. 1-9 illustrate a battery pack 10 that houses a plurality of battery cells. With reference to FIGS. 1 and 2, the battery pack 10 includes an upper housing portion 15, a lower housing portion 20, a left housing portion 25, and a right housing portion 30. The upper housing portion 15 includes a first vent 35, an indicator array portion 40, and latching mechanism portions 45 and 50. The indicator array portion 40 and the latching mechanism portions 45 and 50 are, for example, recesses in the upper housing portion 15 configured to receive all or a portion of an indicator array mechanism (e.g., one or more LEDs, an LCD, etc.) and all or a portion of a latching mechanism, respectively. The left housing portion 25 and the right housing portion 30 are securely fastened to the upper housing portion 15, the lower housing portion 20, or both the upper and lower housing portions 15 and 20 using, for example, one or more screws, bolts, latches, or similar fastening devices. The lower housing portion 20 includes a second vent 55 and a third vent 60, and the second vent 55 and the third vent 60 are opposite one another. The lower housing portion 20 is also the battery cell or battery pack support frame and is configured to receive the plurality of battery cells.

Figure 3:
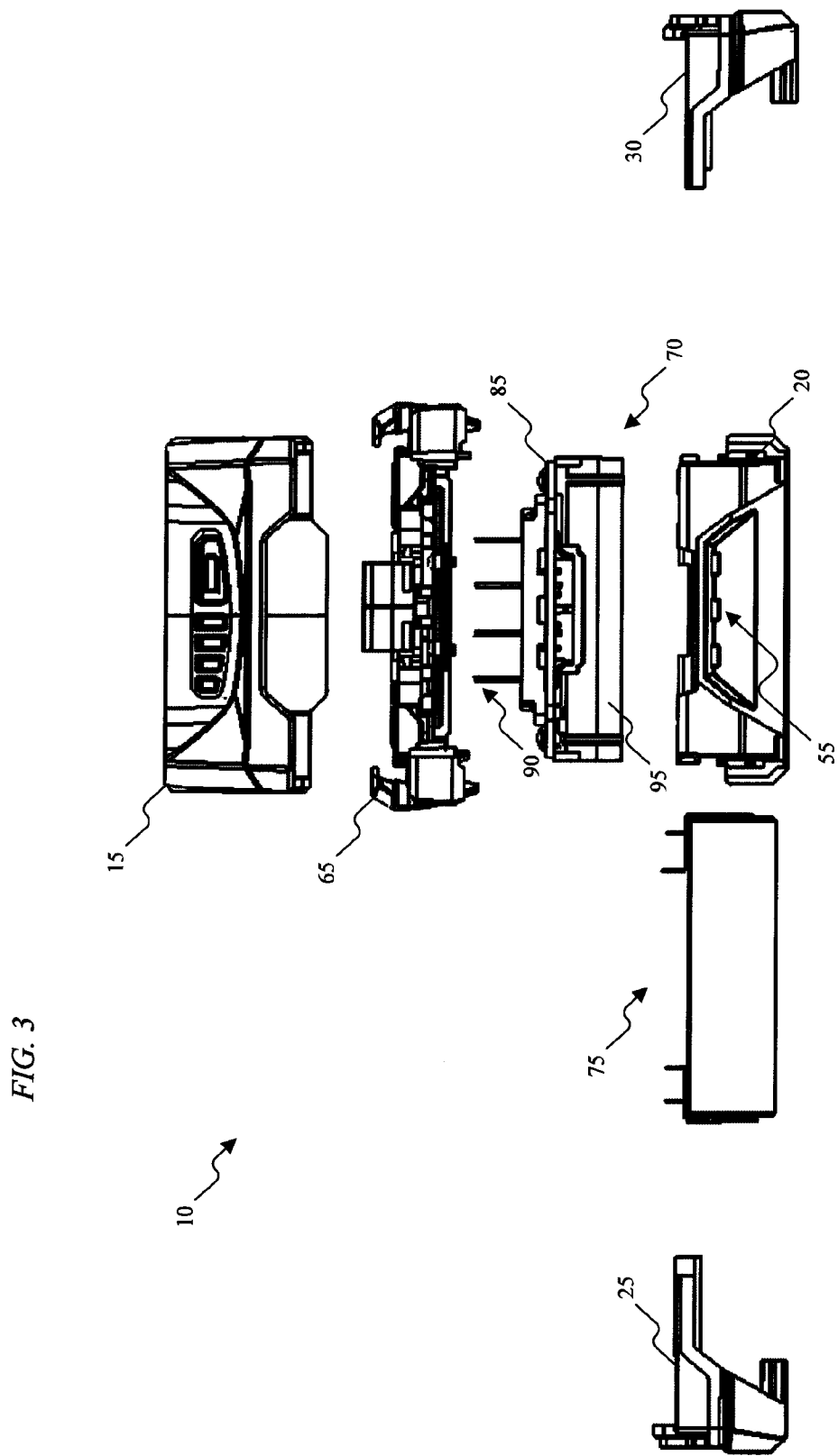
FIG. 3 is a front-exploded view of the battery pack of FIG. 1.
Figure 4:
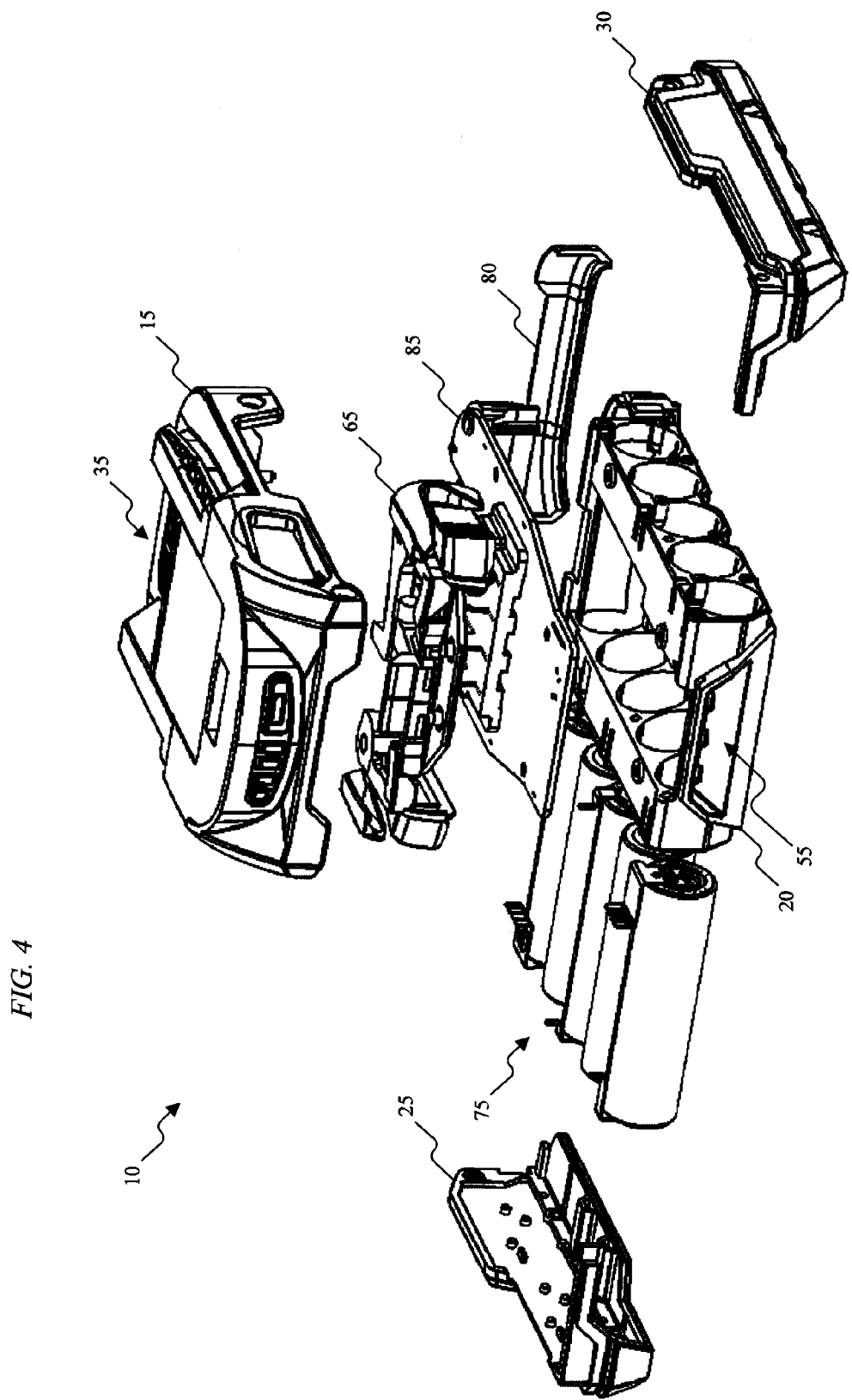
FIG. 4 is a perspective-exploded view of the battery pack of FIG. 1.
Figure 5:
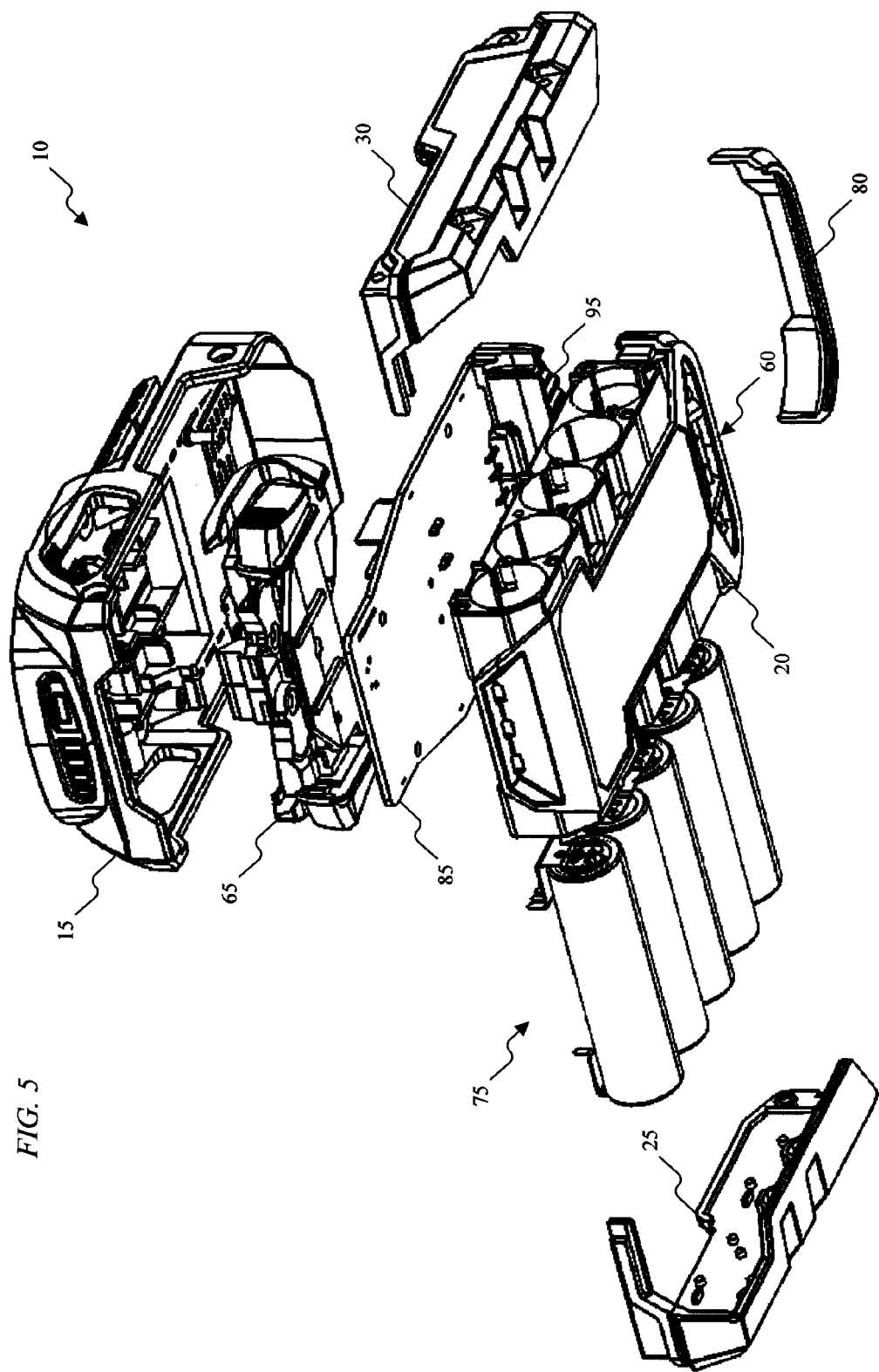
FIG. 5 is another perspective-exploded view of the battery pack of FIG. 1.
Figure 6:
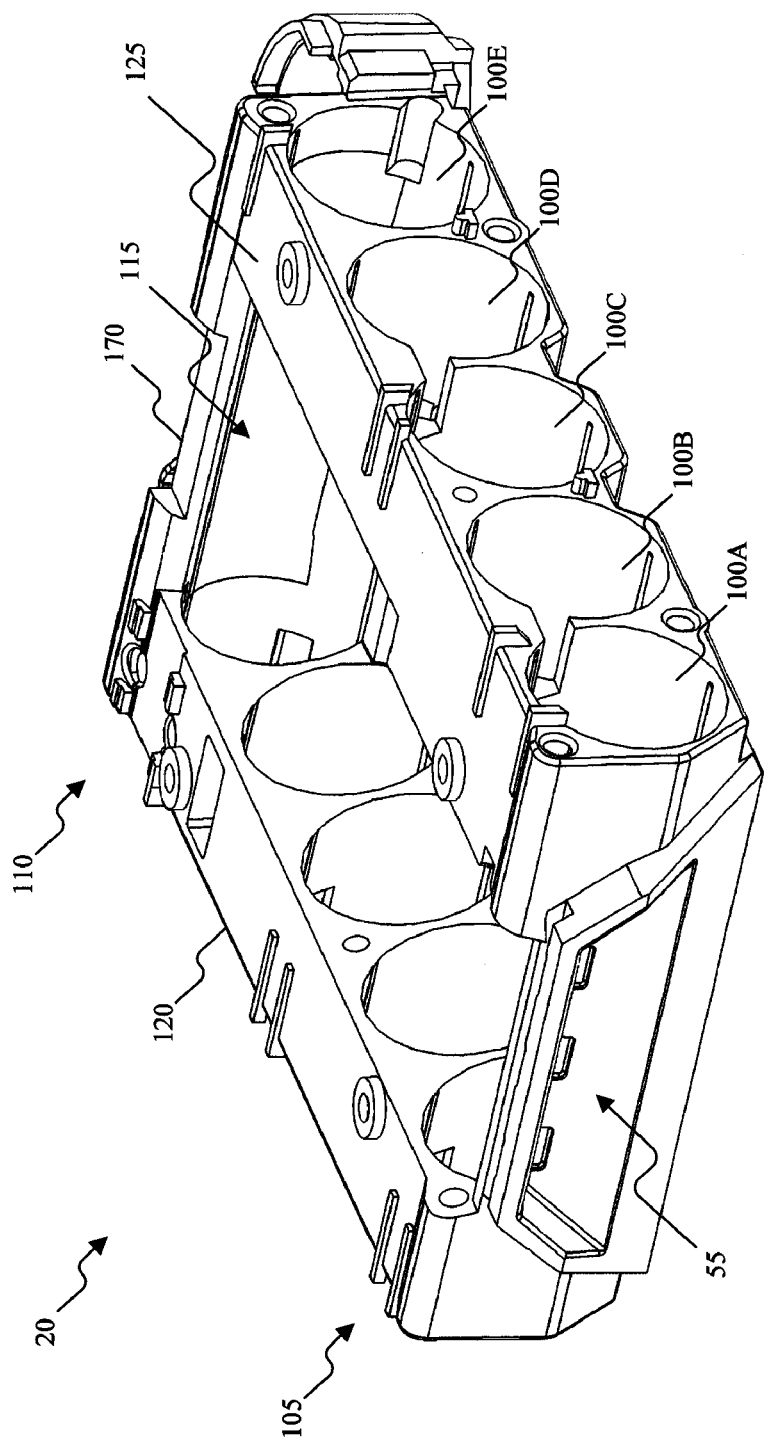
FIG. 6 is a perspective view of a battery pack support frame according to an embodiment of the invention.
Figure 7:
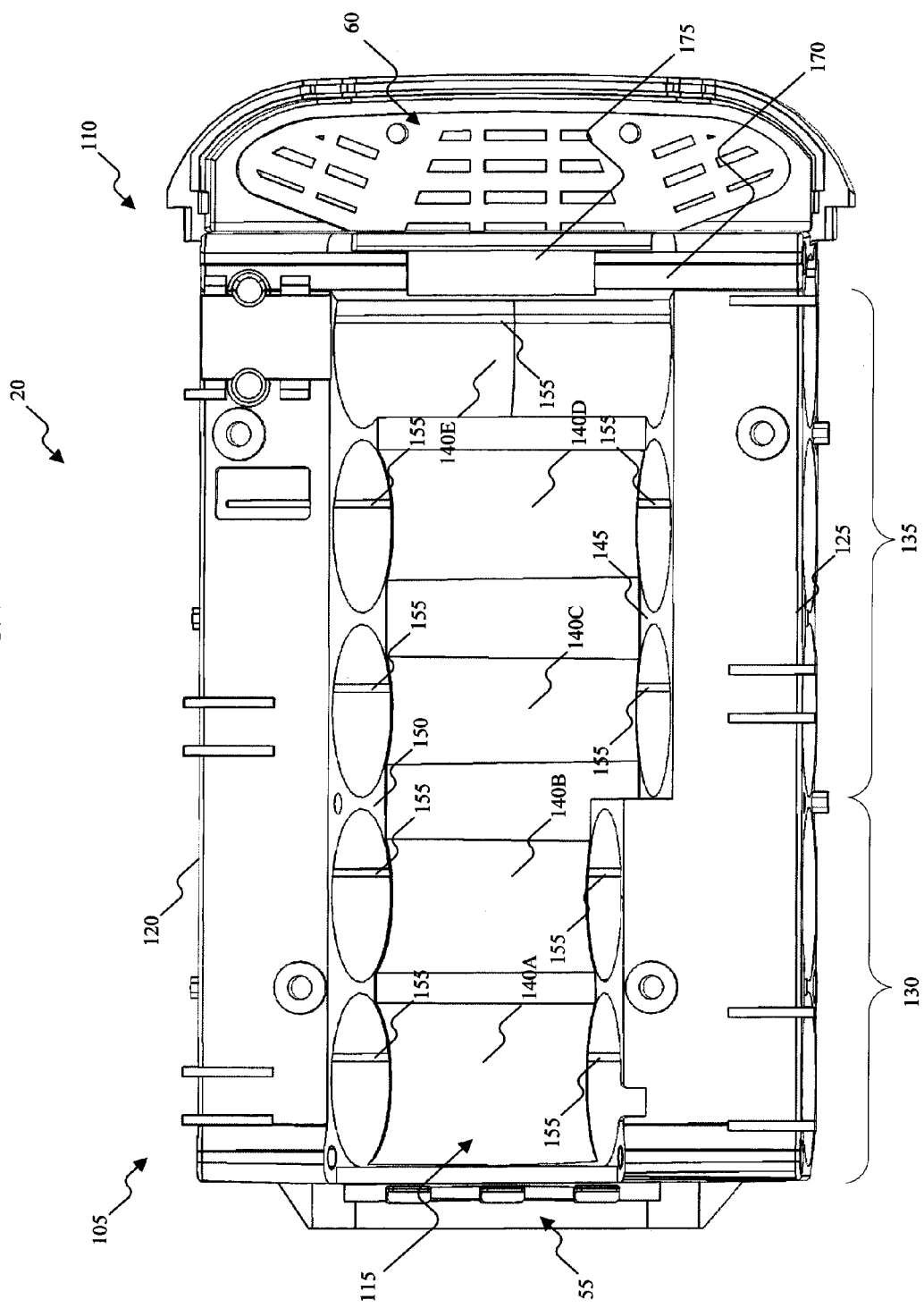
FIG. 7 is a top view of the battery pack support frame of FIG. 6.
Figure 8:
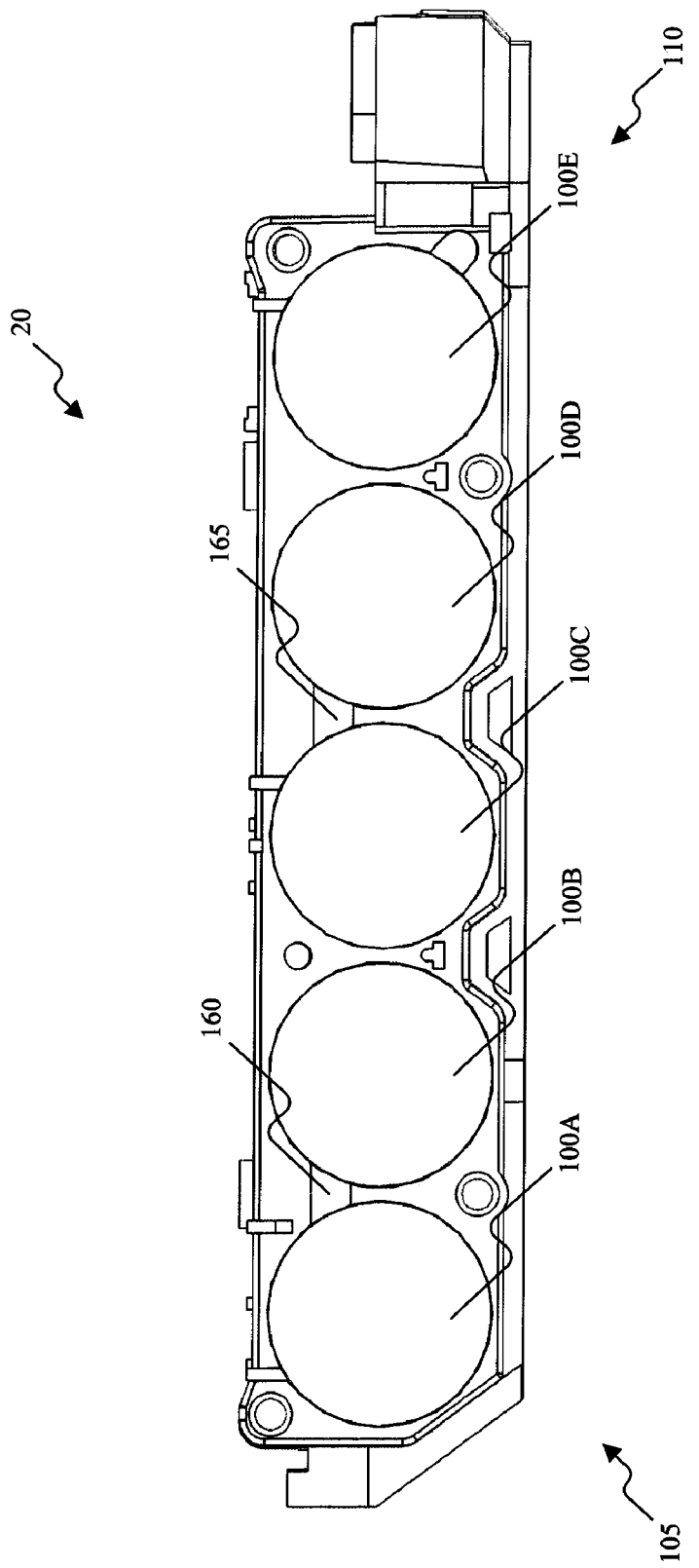
FIG. 8 is a right-side view of the battery pack support frame of FIG. 6.
Figure 9:
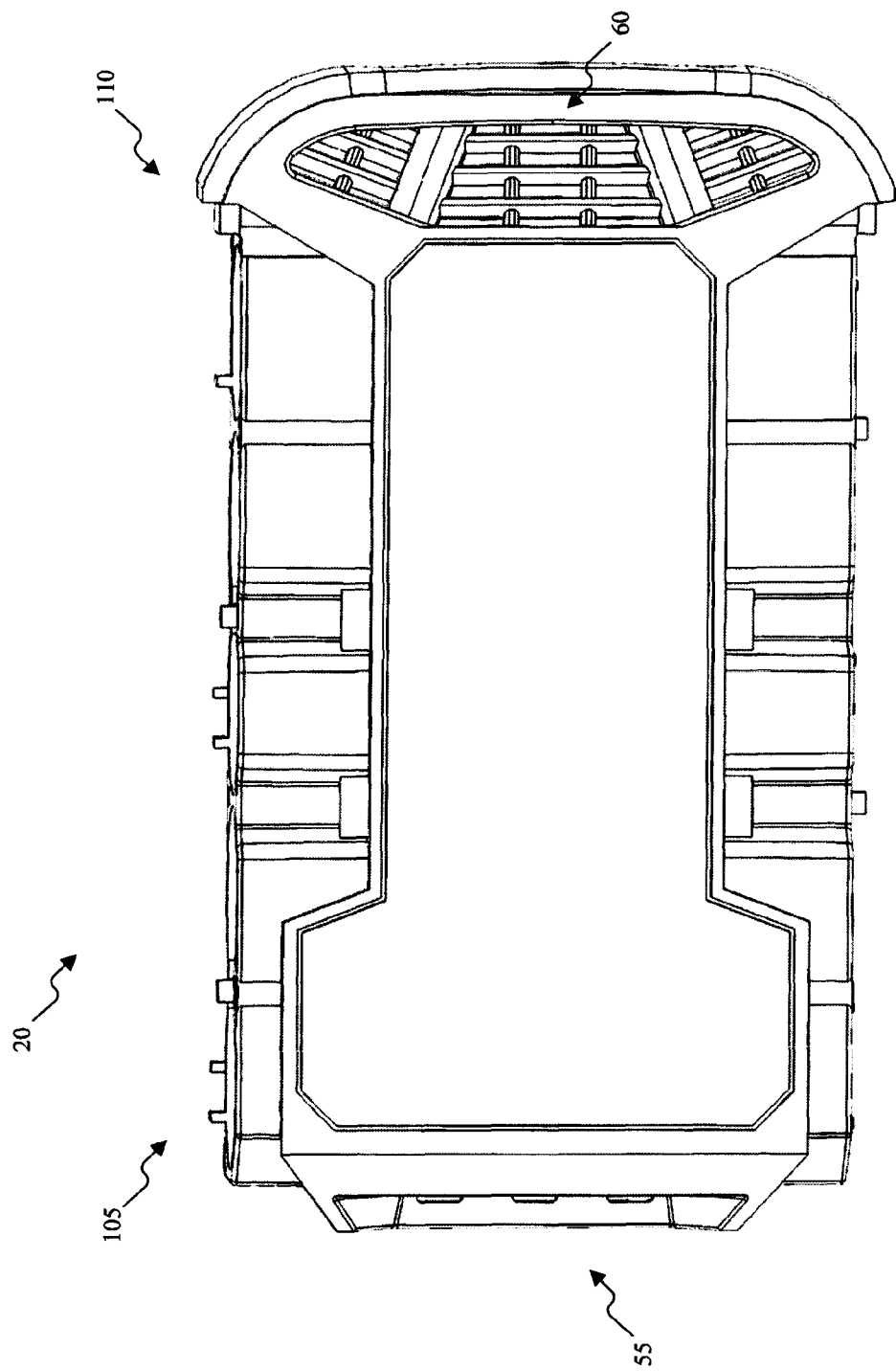
FIG. 9 is a bottom view of the battery pack support frame of FIG. 6.

FIGS. 3-5 are exploded views of the battery pack 10. In addition to the upper housing portion 15, the lower housing portion 20, the left housing portion 25, and the right housing portion 30, the battery pack 10 also includes a latching mechanism 65, a circuit assembly 70, and a plurality of battery cells 75. In the illustrated embodiment, the battery pack 10 also includes a rear housing portion 80. The circuit assembly 70 includes, among other things, a printed circuit board ("PCB") 85, a plurality of terminals 90, and a heat sink 95. The PCB 85 is positioned above and is fastened to the lower housing portion 20. For example, the PCB 85 is fastened to the lower housing portion 20 using a plurality of screws, bolts, latches, or similar fastening devices. The PCB 85 is also electrically isolated from the lower housing portion 20 (i.e., the lower housing portion 20 does not include circuitry or conductive materials for electrical communication with the PCB 85). The heat sink 95 is configured to radiate heat generated by the battery cells 75 and the electrical components on the PCB 85, and the plurality of terminals 90 are configured to electrically connect the battery pack 10 to, for example, a tool or a charger. The latching mechanism 65 is positioned above the PCB 85, and the upper housing portion 15 is positioned above the latching mechanism 65. The battery cells 75 are arranged in a co-planar manner. For example, the battery cells 75 are arranged in a single row, and a first distal end of each battery cell is co-planar with at least one distal end of each of the other battery cells 75. Although a five-cell embodiment of the battery pack support frame 20 is illustrated, the battery pack support frame 20 is capable of being implemented with any number of battery cells (e.g., eight battery cells, ten battery cells, etc.) to achieve a desired voltage or current output of the battery pack 10.

FIGS. 6-9 illustrate the lower housing portion or battery pack support frame 20. The battery pack support frame 20 includes a plurality of battery recesses 100A-100E for receiving the plurality of battery cells 75, the second vent 55 located on a first distal end 105 of the support frame 20, the third vent 60 located on a second distal end 110 of the support frame 20, a recess or air passage 115 located between the second vent 55 and the third vent 60, a first peripheral support section 120, and a second peripheral support section 125. The first peripheral support section 120 and second peripheral support section 125 separate (e.g., space apart) and securely hold the plurality of battery cells 75 within the battery pack 10. The recess 115 positioned between the second vent 55 and the third vent 60 provides an air path for the air which is in contact with the peripheral surfaces of the cells to be exhausted or radiated from each of the second vent 55 and the third vent 60.

The support frame 20 is, for example, a single molded piece of plastic. In some embodiments, the support frame 20 is composed of a heat radiating or heat conducting material. The support frame 20 is configured such that most or all of the primary components of the battery pack 10 (e.g., the upper housing portion 15, the left housing portion 25, the right housing portion 30, the latching mechanism 65, and the circuit assembly 70) are, in some manner, coupled to or are connected to the support frame 20. Such a configuration simplifies the assembly and disassembly of the battery pack 10.

In the illustrated embodiment, the battery pack 10 is passive in that air is allowed to flow into or out of each of the first vent 35, the second vent 55, and the third vent 60 based on the movement of the battery pack 10 (e.g., when the battery pack 10 is being carried by a worker). The battery pack 10 does not include and is not configured to connect to a device that forces air through one or more of the first, second, or third vents 35, 55, or 60 (e.g., the battery pack 10 does not include a dedicated air intake or air exhaust).

In the illustrated embodiment of the battery pack support frame 20, the recess 115 also includes a first section 130 and a second section 135. The first section 130 and the second section 135 are offset from one another such that a distance between the first peripheral support section 120 and the second peripheral support section 125 in the first section 130 is less than a distance between the first peripheral support section 120 and the second peripheral support section 125 in the second section 135. In other embodiments, the distance between the first peripheral support section 120 and the second peripheral support section 125 in the first section 130 is greater than the distance between the first peripheral support section 120 and the second peripheral support section 125 in the second section 135.

The distances between the first peripheral support section 120 and the second peripheral support section 125 in the first and second sections 130 and 135 of the recess 115 are varied for a variety of reasons. For example, the PCB 85 includes a plurality of electrical components that generate and radiate heat. Because the PCB 85 is positioned above the battery pack support frame 20, the heat radiated by the electrical components of the PCB 85 is combined with the heat radiated by the battery cells 75 and causes the battery cells 75 to overheat more quickly. As such, depending upon the placement of components on the PCB 85 that radiate the greatest amount of heat, the distances between the first peripheral support section 120 and the second peripheral support section 125 are modified. The section of the recess 115 closest to the PCB components that radiate the most heat is made wider than the other sections of the recess 115 to allow a greater amount of heated air to be radiated or exhausted out of the corresponding vent (e.g., the second vent 55 or the third vent 60). In other embodiments, the recess 115 has a uniform width between the first peripheral support section 120 and the second peripheral support section 125.

A lower or bottom portion of the recess 115 includes a plurality of grooves 140A-140E for receiving the battery cells 75, but a majority of the outer or peripheral side surfaces of the battery cells located between the first peripheral support section 120 and the second peripheral support section 125 are exposed to the air within the recess 115. In some embodiments, at least 180° of the peripheral side surface of at least one of the battery cells 75 located between the first peripheral support section 120 and the second peripheral support section 125 are exposed to the air within the recess 115. In other embodiments, the lower portion of the recess 115 does not include the plurality of grooves or the grooves are below the battery cells 75 such that 360° of the peripheral side surface of at least one of the battery cells 75 located between the first peripheral support section 120 and the second peripheral support section 125 are exposed to the air within the recess 115. In some embodiments, 360° of the peripheral side surfaces of a plurality of the battery cells 75 located between the first peripheral support section 120 and the second peripheral support section 125 are exposed to the air within the recess 115.

The recess 115 also includes a taper along interior side surfaces 145 and 150. The taper provides for a wider opening at an upper portion of the recess 115 and a narrower opening at a lower portion of the recess 115. In the illustrated embodiment, the taper is less than, for example, approximately 5°. In other embodiments, the taper is greater than approximately 5°. Because both the battery cells 75 and the PCB 85 radiate heat, a larger recess is beneficial near the PCB 85 (i.e., at the upper portion of the recess 115). In other embodiments, the taper varies throughout the recess 115. For example, the taper is different in the first and second sections 130 and 135. In some embodiments, the taper in the first section 130 is less than the taper in the second section 135, or the taper in the first section 130 is greater than the taper in the second section 135. The recess 115 is uniform when, for example, the taper along the interior side surfaces 145 and 150 is approximately or substantially the same, when there is no taper along the interior side surfaces 145 and 150, or when the taper of at least one of the interior side surfaces 145 and 150 is constant along the entire length or at least a portion of the length of the interior side surface.

The battery recesses 100A-100E in each of the first and second peripheral support sections 120 and 125 are separated from each other to provide space between each of the battery cells 75. In some embodiments, each of the battery recesses 100A-100E also includes one or more protrusions 155. The protrusions 155 separate the battery cells 75 from the interior surface of the battery recesses 100A-100E to provide an air path between the recess 115 and a top and bottom portion of each cell. In some embodiments, the protrusions 155 allow air to pass from the terminal portions of each battery cell 75 into the recess 115 such that there is substantially no portion of the support frame 20 that is isolated from recess 115, the second vent 55, and the third vent 60.

The support frame 20 also includes cell connection portions 160 and 165. For example, the cell connection portions 160 and 165 are configured to receive a connection plate or terminal connector to connect a positive end of a first cell to a negative end of a second cell. In other embodiments, one or more of the cell connection portions 160 and 165 connects a positive terminal of a first cell to a positive terminal of a second cell, or a negative terminal of a first cell to a negative terminal of a second cell. In some embodiments, the left side of the support frame 20 includes one or more similar cell connection portions.

The second vent 55 positioned on the first distal end 105 of the support frame 20 includes a plurality of apertures for venting or radiating heated air from inside the battery pack 10. In other embodiments, the second vent 55 includes a single aperture. The third vent 60 is positioned below the heat sink 95 and includes one or more apertures. In some embodiments, the third vent 60 is partially separated from the recess 115 by a wall 170 to prevent a portion of the heat radiated by the heat sink 95 from entering the recess 115. A notch 175 in the wall 170 provides an air path for the heated air from the recess to be exhausted or radiated from the third vent 60.

With reference once again to FIGS. 1 and 2, the first vent 35 is positioned on a top portion of the upper housing portion 15. The first vent 35 is configured to exhaust or radiate air heated by the electrical components on the PCB 85. The first vent 35 is positioned approximately or substantially directly above the third vent 60, and the first vent 35 and the third vent 60 exhaust or radiate heated air in substantially opposite directions. Each of the first vent 35 and the third vent 60 are also positioned such that the second vent 55 exhausts or radiates heated air in a direction that is approximately or substantially orthogonal to the direction in which the first vent 35 and the third vent 60 exhaust or radiate air. The first vent 35 and the third vent 60 are completely or at least partially separated (e.g., isolated) from one another by the heat sink 95, the PCB 85, or a combination of the heat sink 95 and the PCB 85. The heat sink 95, the PCB 85, or a combination of the heat sink 95 and the PCB 85 also completely or at least partially separate the second vent 55 and the recess 115 from the first vent 35. As such, the first vent 35 is approximately or substantially independent of the second vent 55, the third vent 60, and the recess 115.

Figure 10:
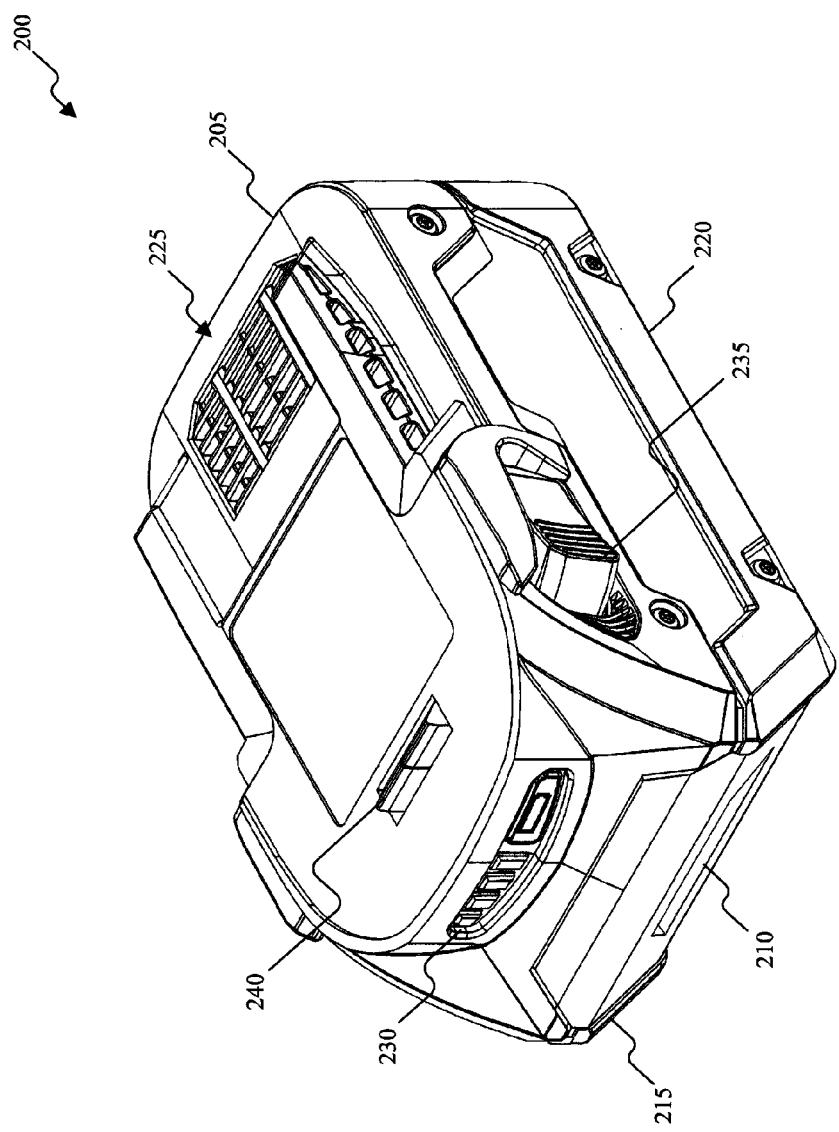
FIG. 10 is a perspective view of a battery pack according to another embodiment of the invention.
Figure 11:
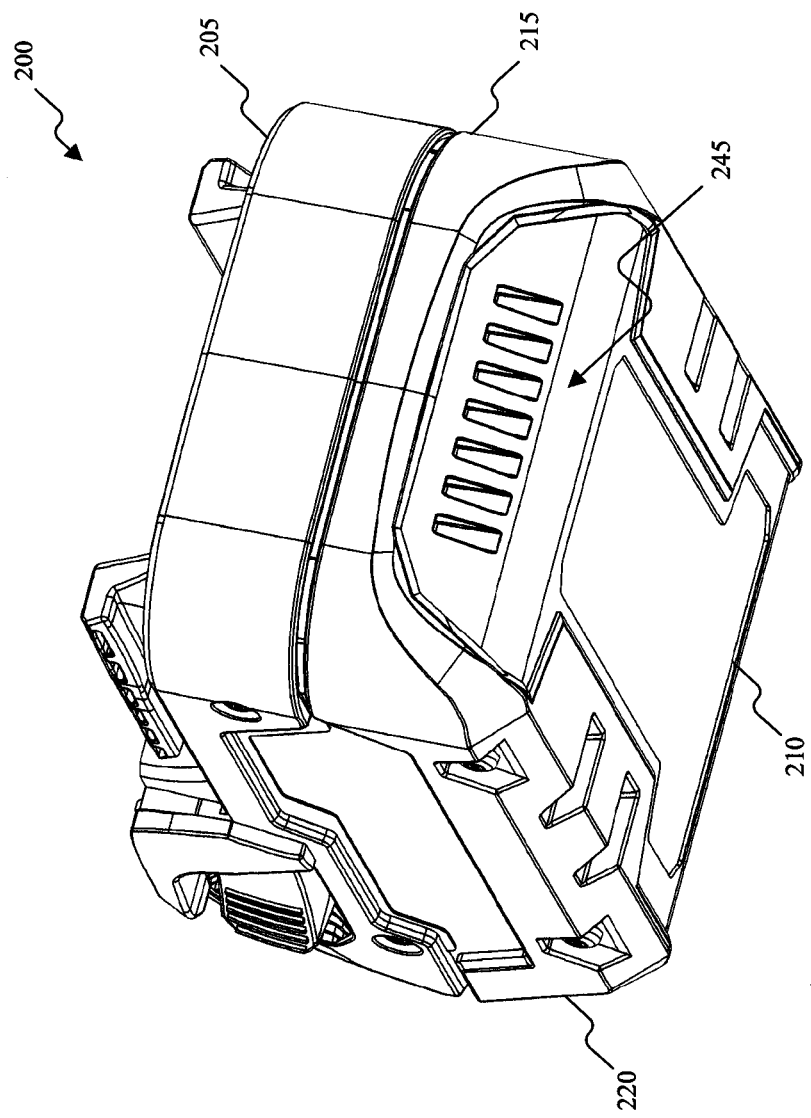
FIG. 11 is another perspective view of the battery pack of FIG. 10.
Figure 12:
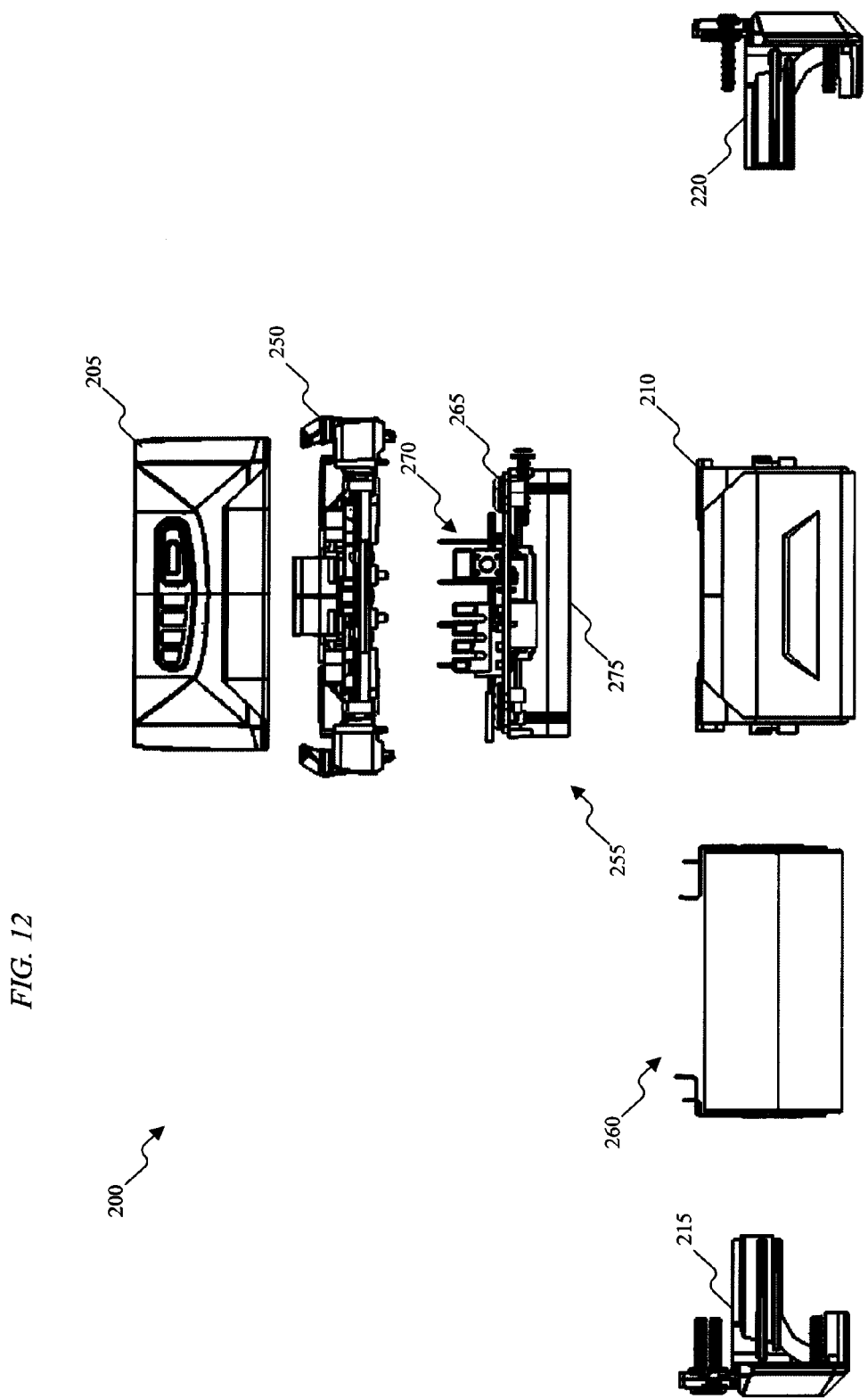
FIG. 12 is a front-exploded view of the battery pack of FIG. 10.
Figure 13:
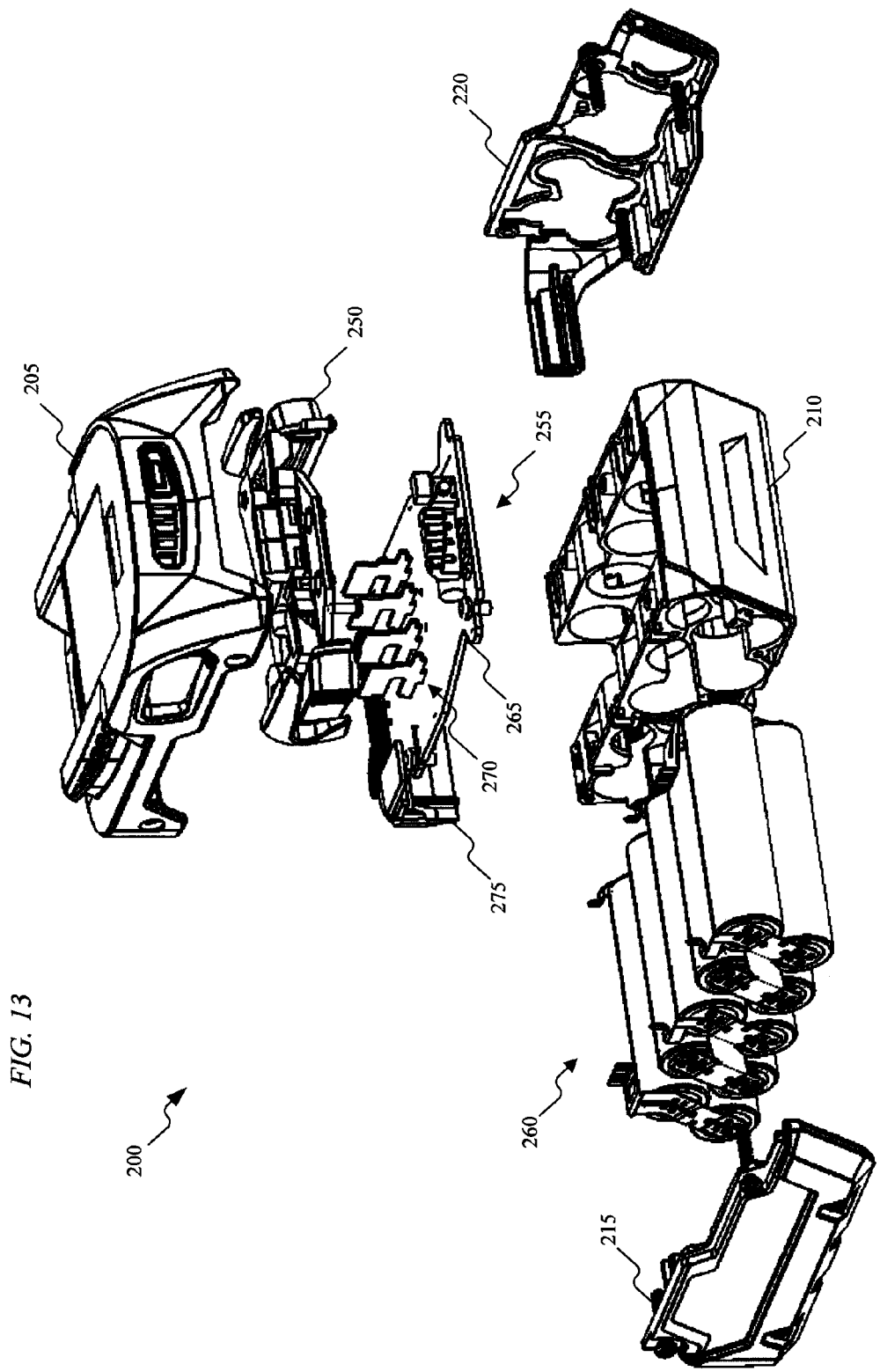
FIG. 13 is a perspective-exploded view of the battery pack of FIG. 10.
Figure 14:
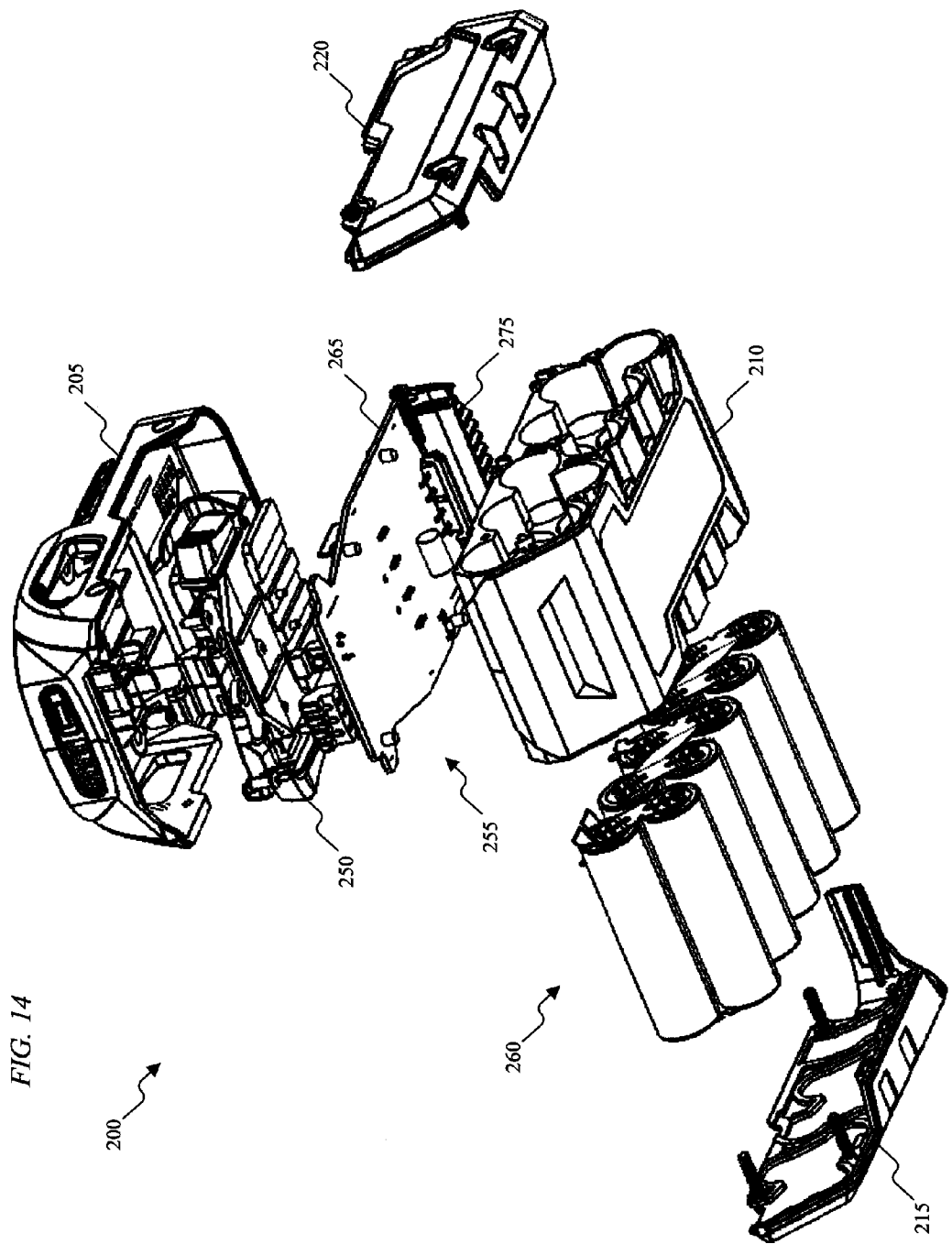
FIG. 14 is another perspective-exploded view of the battery pack of FIG. 10.
Figure 15:
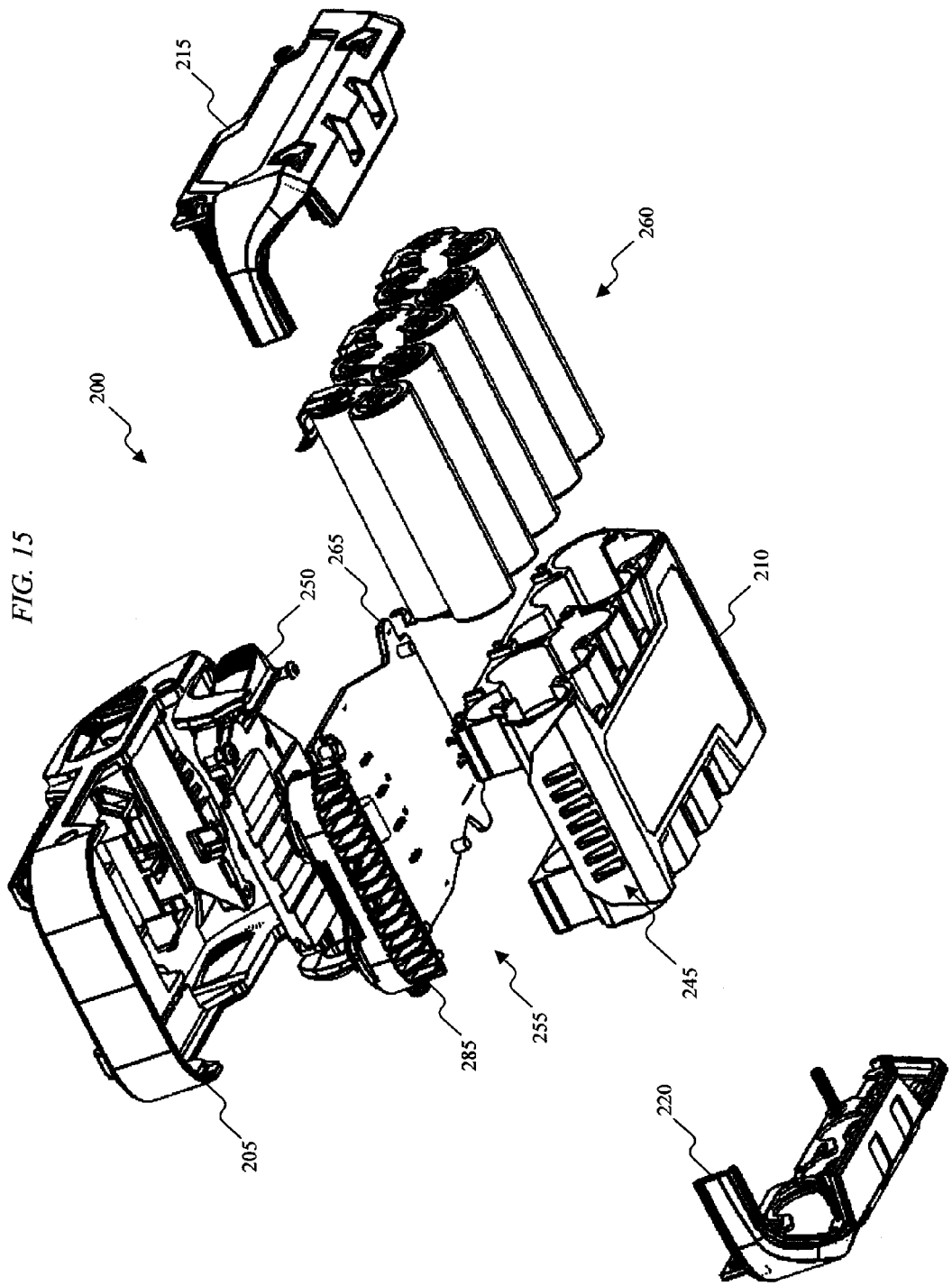
FIG. 15 is another perspective-exploded view of the battery pack of FIG. 10.
Figure 16:
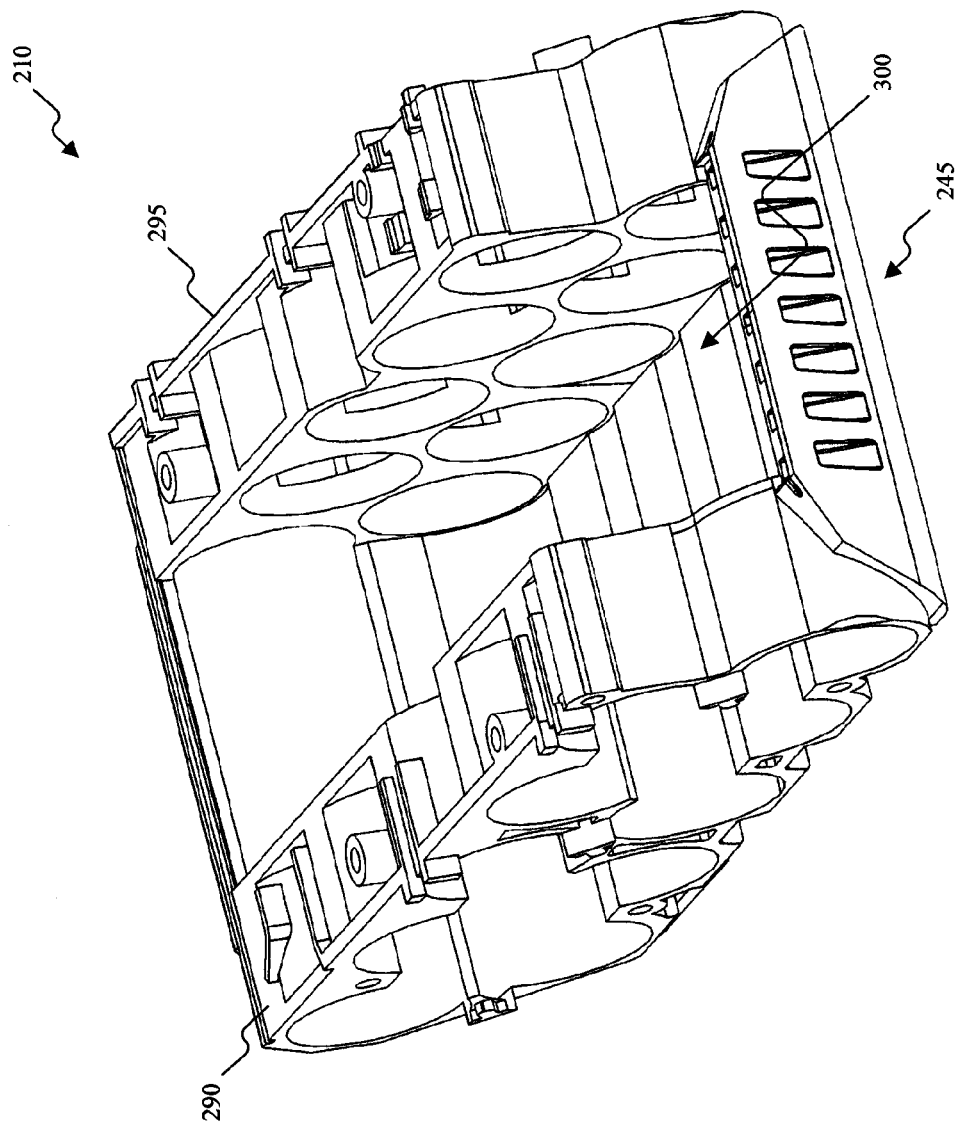
FIG. 16 is a perspective view of a battery pack support frame according to an embodiment of the invention.
Figure 17:
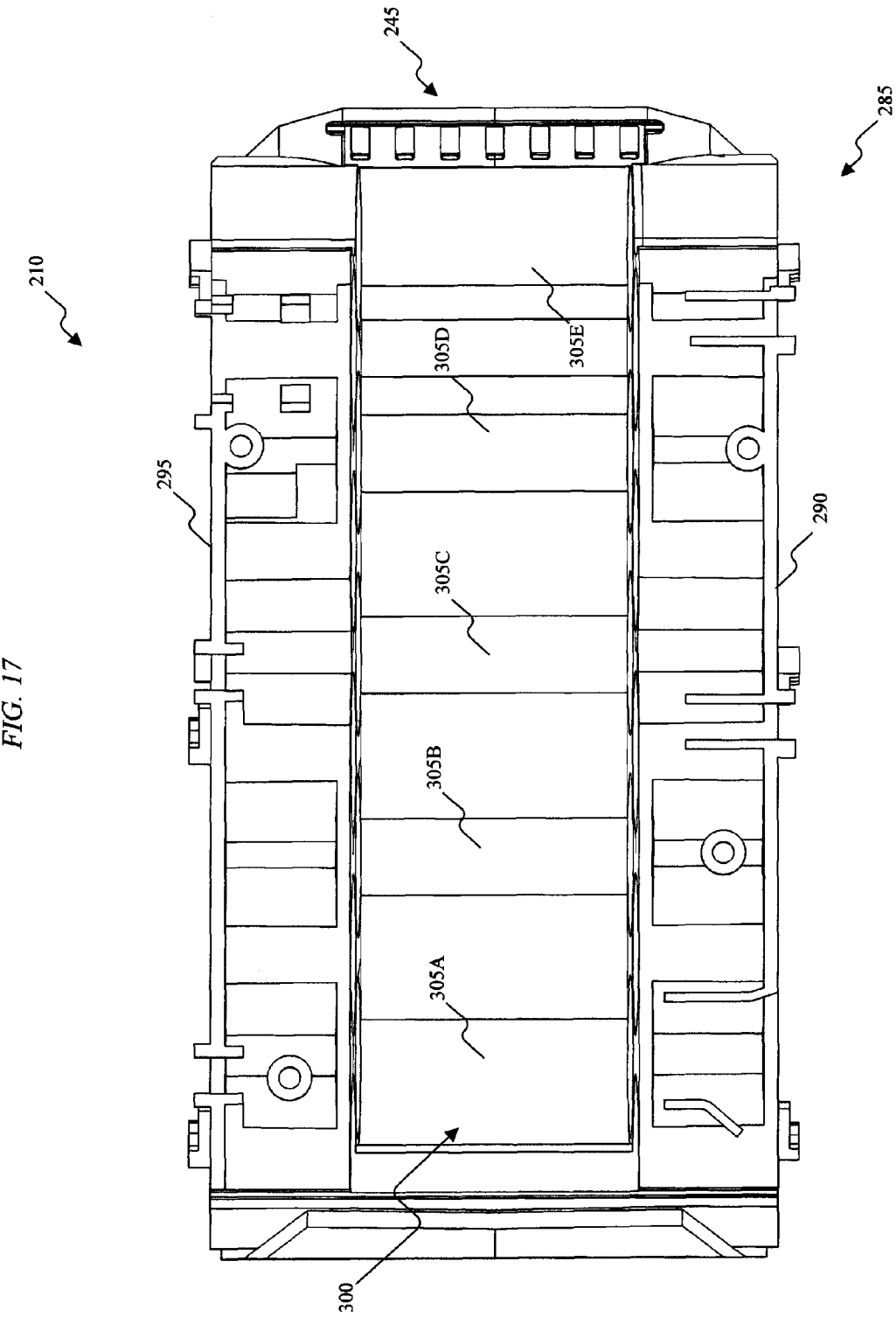
FIG. 17 is a top view of the battery pack support frame of FIG. 16.
Figure 18:
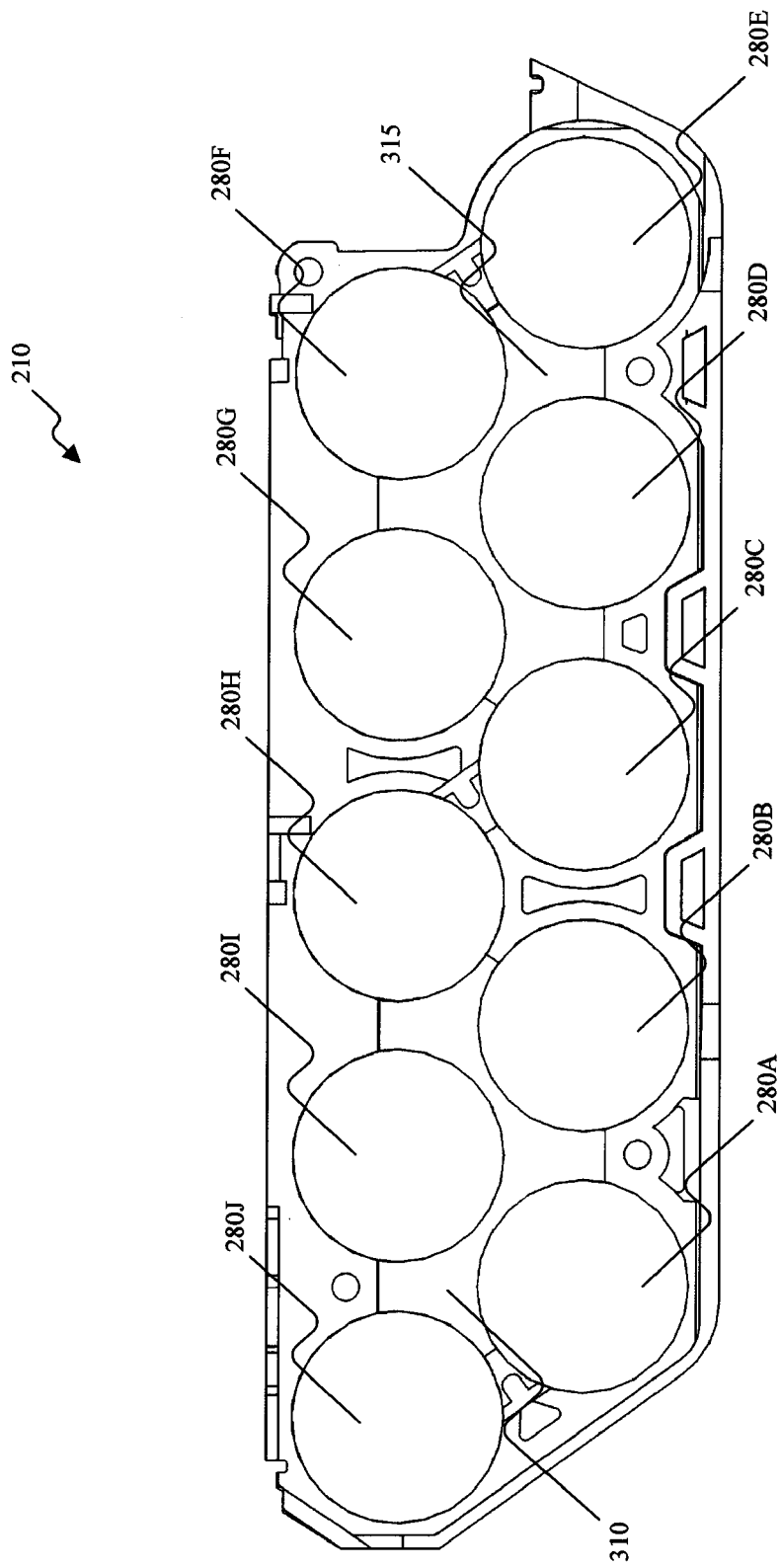
FIG. 18 is a right-side view of the battery pack support frame of FIG. 16.
Figure 19:
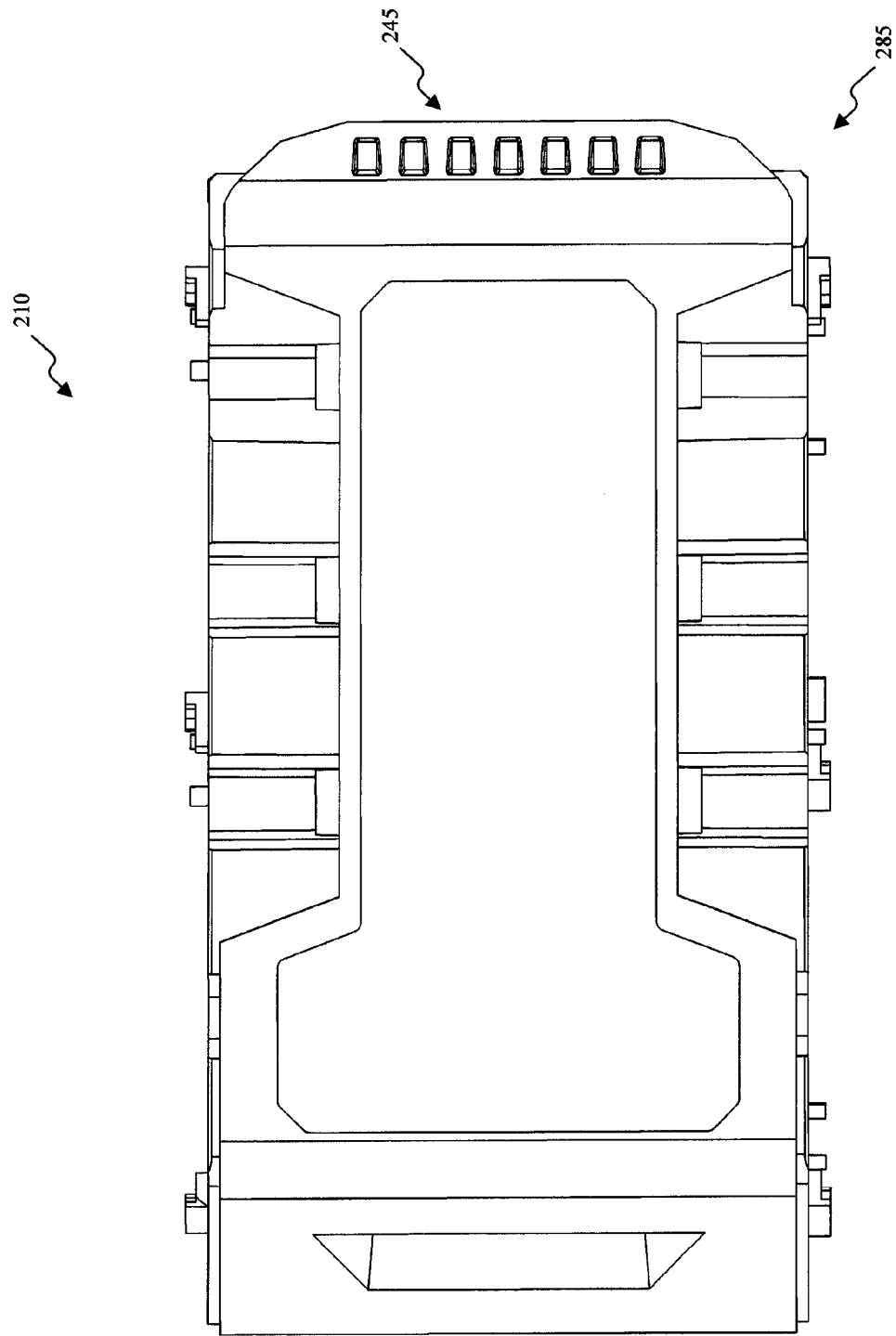
FIG. 19 is a bottom view of the battery pack support frame of FIG. 16.

FIGS. 10-19 illustrate a battery pack 200 that is similar to the battery pack 10 described above with respect to FIGS. 1-9. With reference to FIGS. 10 and 11, the battery pack 200 includes an upper housing portion 205, a lower housing portion 210, a left housing portion 215, and a right housing portion 220. The upper housing portion 205 includes a first vent 225, an indicator array portion 230, and latching mechanism portions 235 and 240. The indicator array portion 230 and the latching mechanism portions 235 and 240 are, for example, recesses in the upper housing portion 205 configured to receive all or a portion of an indicator array mechanism (e.g., one or more LEDs, an LCD, etc.) and all or a portion of a latching mechanism, respectively. The left housing portion 215 and the right housing portion 220 are securely fastened to the upper housing portion 205, the lower housing portion 210, or both the upper and lower housing portions 205 and 210 using, for example, one or more screws, bolts, latches, or similar fastening devices. The lower housing portion 210 is a battery cell or battery pack support frame configured to receive a plurality of battery cells and includes a second vent 245.

FIGS. 12-15 are exploded views of the battery pack 200. In addition to the upper housing portion 205, the lower housing portion 210, the left housing portion 215, and the right housing portion 220, the battery pack 200 also includes a latching mechanism 250, a circuit assembly 255, and a plurality of battery cells 260. The circuit assembly 255 includes, among other things, a PCB 265, a plurality of terminals 270, and a heat sink 275. The PCB 265 is positioned above and fastened to the lower housing portion 210. For example, the PCB 265 is fastened to the lower housing portion 210 using a plurality of screws, bolts, latches, or similar fastening devices. The PCB 265 is also electrically isolated from the lower housing portion 210 (i.e., the lower housing portion 210 does not include circuitry or conductive materials for electrical communication with the PCB 265). The heat sink 275 is configured to radiate heat generated by the battery cells 260 and the electrical components on the PCB 265, and the plurality of terminals 270 are configured to electrically connect the battery pack 200 to, for example, a tool or a charger. The latching mechanism 250 is positioned above the PCB 265, and the upper housing portion 205 is positioned above the latching mechanism 250. The battery cells 260 are arranged in two rows and the cells within each row are co-planar. For example, the battery cells 260 are arranged in a first row of five cells and a second row of five cells. A first distal end of each battery cell is co-planar with at least one distal end of each of the other battery cells.

FIGS. 16-19 illustrate the lower housing portion or battery pack support frame 210. The battery pack support frame 210 includes a plurality of battery recesses 280A-280J for receiving the plurality of battery cells 260, the second vent 245 located on a first distal end 285 of the support frame 210, a first peripheral support section 290, a second peripheral support section 295, and a recess or air passage 300 located between the first peripheral support section 290 and the second peripheral support section 295. The first peripheral support section 290 and second peripheral support section 295 separate (e.g., space apart) and securely hold the plurality of battery cells 260 within the battery pack 200. The recess 300 provides an air path for the air which is in contact with the peripheral surfaces of the battery cells 260 to be exhausted or radiated from the second vent 245.

The support frame 210 is, for example, a single molded piece of plastic. In some embodiments, the support frame is composed of a heat radiating or heat conductive material. The support frame 210 is configured such that most or all of the primary components of the battery pack (e.g., the upper housing portion 205, the left housing portion 215, the right housing portion 220, the latching mechanism 250, and the circuit assembly 255) are, in some manner, coupled to or connected to the support frame 210. Such a configuration simplifies the assembly and disassembly of the battery back 200.

In the illustrated embodiment, the battery pack 200 is passive in that air is allowed to enter or exit each of the first vent 225 and the second vent 245 based on, for example, the movement of the battery pack 200 (e.g., when the battery pack 200 is being carried by a worker). The battery pack 200 does not include and is not configured to connect to a device that forces air through either the first vent 225 or second vent 245 (e.g., the battery pack 200 does not include a dedicated air intake or air exhaust).

The recess 300 is uniform, and the first peripheral support section 290 is parallel to the second peripheral support section 295. Such a configuration maximizes the surface area of the battery cells 260 from which heat is able to be radiated while maintaining the battery cell stability provided by the first peripheral support section 290 and the second peripheral support section 295.

In some embodiments, the recess 300 also includes a first section and a second section, as previously described with respect to battery pack 10. The first section and the second section are offset from one another in that a distance between the first peripheral support section 290 and the second peripheral support section 295 in the first section is less than a distance between the first peripheral support section 290 and the second peripheral support section 295 in the second section. In other embodiments, the distance between the first peripheral support section 290 and the second peripheral support section 295 in the first section is greater than the distance between the first peripheral support section 290 and the second peripheral support section 295 in the second section.

The distances between the first peripheral support section 290 and the second peripheral support section 295 in the first and second sections of the recess 300 are varied for any of a variety of reasons. For example, the PCB 265 includes a plurality of electrical components that generate and radiate heat. Because the PCB 265 is positioned above the battery pack support frame 210, the heat radiated by the electrical components of the PCB 265 is combined with the heat radiated by the battery cells 260 and causes the battery cells 260 to overheat more quickly. As such, depending upon the placement of components on the PCB 265 that radiate the greatest amount of heat, the distances between the first peripheral support section 290 and the second peripheral support section 295 are modified. The section of the recess 300 which is closest to the PCB 265 components which radiates the most heat is made wider than the other sections of the recess 300 to allow a greater amount of heated air to pass out of the corresponding vent (e.g., the second vent 245).

In some embodiments, the recess 300 also includes a taper along interior side surfaces of the first and second peripheral support sections 290 and 295. The taper provides for a wider opening at an upper portion of the recess 300 and a narrower opening at a lower portion of the recess. The taper is, for example, less than approximately 5°. In other embodiments, the taper is greater than approximately 5°. Because both the battery cells 260 and the PCB 265 radiate heat, a larger recess is beneficial near the PCB 265 (i.e., at the upper portion of the recess 300). In other embodiments, the taper varies throughout the recess 300. For example, the taper is different in the first and second sections of the recess 300. In some embodiments, the taper in the first section is less than the taper in the second section. In other embodiments, the taper in the first section is greater than the taper in the second section.

A lower portion of the recess 300 includes a plurality of grooves 305A-305E. The grooves 305A-305E are contoured to the shape of the battery cells 260 and are set below the battery cells 260 such that at least one of the battery cells 260 is not in contact with the grooves 305A-305E or the lower portion of the recess 300. As such, a majority of the outer or peripheral side surface of the at least one of the battery cells 260 that is located between the first peripheral support section 290 and the second peripheral support section 295 is exposed to the air within the recess 300. In some embodiments, at least 180° of the peripheral side surface of the at least one of the battery cells 260 that is between the first peripheral support section 290 and the second peripheral support section 295 are exposed to the air within the recess 300. In other embodiments, 360° of the peripheral side surface of the at least one of the battery cells 260 that is located between the first peripheral support section 290 and the second peripheral support section 295 are exposed to the air within the recess 300. In some embodiments, 360° of the peripheral side surfaces of a plurality of the battery cells 260 located between the first peripheral support section 290 and the second peripheral support section 295 are exposed to the air within the recess 300. Such an arrangement maximizes the amount of heat that is able to be radiated from the battery cells 260. The second vent 245 is positioned below the heat sink 275, and includes a plurality of apertures configured to exhaust or radiate the heated air from within the recess 300. In other embodiments, additional vents are provided in the battery pack support frame 210. For example, a third vent is included in the battery pack support frame 210 which opposes the second vent 245, as described above with respect to the battery pack support frame 20.

The battery recesses 280A-280J in each of the first and second peripheral support sections 290 and 295 are separated from each other to provide space between each of the battery cells 260. In some embodiments, the battery recesses 280A-280J also include one or more protrusions that separate the battery cells 260 from the interior surface of the battery recesses 280A-280J to provide an air path between the recess 300 and a top and bottom portion of each cell. In some embodiments, the protrusions allow air to pass from the terminal portions of each battery cell 260 into the recess 300 such that there is substantially no portion of the support frame 210 that is isolated from recess 300 and the second vent 245.

The support frame 210 also includes cell connection portions 310 and 315. For example, the cell connection portions 310 and 315 are configured to receive a connection plate or terminal connector to connect a positive end of a first cell to a negative end of a second cell. In some embodiments, the cell connection portions are configured to receive a connection plate or terminal connector to connect a positive terminal of a first cell to a positive terminal of a second cell or a negative terminal of a first cell to a negative terminal of a second cell. In some embodiments, the left side of the support frame 20 includes one or more similar cell connection portions.

With reference once again to FIGS. 10 and 11, the first vent 225 is positioned on a top portion of the upper housing portion 205. The first vent 225 is configured to radiate heat generated by the electrical components on the PCB 265. The first vent 225 is positioned approximately or substantially directly above the second vent 245, and the first vent 225 and the second vent 245 exhaust or radiate heated air in substantially opposite directions. The first vent 225 and the second vent 245 are completely or at least partially separated or isolated from one another by the heat sink 275, the PCB 265, or a combination of the heat sink 275 and the PCB 265. The heat sink 275, the PCB 265, or a combination of the heat sink 275 and the PCB 265 also separate or isolate the recess 300 from the first vent 225. As such, the first vent 225 is approximately or substantially independent of the second vent 245 and the recess 300.

Thus, the invention provides, among other things, a battery pack that includes an upper housing having a first air vent, and a support frame having a second vent, a third vent, and an air passage between the second vent and the third vent. Various features and advantages of the invention are set forth in the following claims.

What is claimed is:

1. A battery pack, the battery pack comprising:
  a housing portion including a first air vent;
  a support frame configured to receive a plurality of battery cells and to space apart the battery cells from one another, the support frame including
    a second air vent positioned at a first end of the support frame,
    a third air vent positioned at a second end of the support frame, and
    an air passage positioned between the second air vent and the third air vent, the first air vent positioned on the same side of the support frame as the third air vent, and the first air vent at least partially isolated from the third air vent by a heat sink.

2. The battery pack of claim 1, further comprising a circuit assembly, the circuit assembly including
  a printed circuit board,
  a plurality of terminals, and
  the heat sink.

3. The battery pack of claim 2, wherein the circuit assembly is electrically isolated from the support frame.

4. The battery pack of claim 2, wherein the circuit assembly is positioned above the support frame.

5. The battery pack of claim 2, wherein the circuit assembly is secured to the support frame.

6. The battery pack of claim 1, further comprising a printed circuit board positioned above the support frame.

7. The battery pack of claim 1, further comprising a side housing portion configured to fasten to the support frame.

8. The battery pack of claim 1, wherein the support frame includes a first peripheral support section and a second peripheral support section.

9. The battery pack of claim 8, wherein the air passage is formed between the first peripheral support section and the second peripheral support section.

10. The battery pack of claim 9, wherein the air passage is uniform in width between the first peripheral support section and at least a portion of the second peripheral support section.

11. The battery pack of claim 9, wherein an outer portion of at least one of the plurality of battery cells between the first peripheral support section and the second peripheral support section is substantially completely exposed to air within the air passage.

12. A battery pack, the battery pack comprising:
  a housing including a first air vent;
  a support frame configured to receive a plurality of battery cells, the battery cells being spaced apart from one another by the support frame, the support frame including
    a second air vent positioned at a distal end of the support frame, the second air vent positioned below the first air vent, and the second air vent being at least partially isolated from the first air vent by a heat sink;
    a first peripheral support section;
    a second peripheral support section; and
    a recess within the support frame having a uniform width between the first peripheral support section and the second peripheral support section,
  wherein an outer surface of at least one of the plurality of battery cells between the first peripheral support section and the second peripheral support section is substantially completely exposed to air within the recess.

13. The battery pack of claim 12, further comprising a printed circuit board positioned above the support frame.

14. The battery pack of claim 12, further comprising a circuit assembly, the circuit assembly including
  a printed circuit board,
  a plurality of terminals, and
  the heat sink.

15. The battery pack of claim 14, wherein the circuit assembly is electrically isolated from the support frame.

16. The battery pack of claim 15, wherein the circuit assembly is positioned above the support frame.

17. The battery pack of claim 16, wherein the circuit assembly is secured to the support frame.

18. A battery pack comprising:
- a support frame configured to receive a plurality of battery cells, the plurality of battery cells physically spaced apart from one another by the support frame, the support frame including
    - a first air vent positioned at a first end of the support frame,
    - a second air vent positioned at a second end of the support frame,
    - a first peripheral support section,
    - a second peripheral support section, and
    - an air passage formed between the first peripheral support section and the second peripheral support section and extending between the first air vent and the second air vent,
- wherein an outer surface of at least one of the plurality of battery cells between the first peripheral support section and the second peripheral support section is substantially completely exposed to air within the air passage.

19. The battery pack of claim 18, wherein the air passage is substantially uniform in width between the first peripheral support section and at least a portion of the second peripheral support section.

20. The battery pack of claim 18, wherein the air passage includes a first section and a second section.

* * * * *